Patented Sept. 25, 1928.

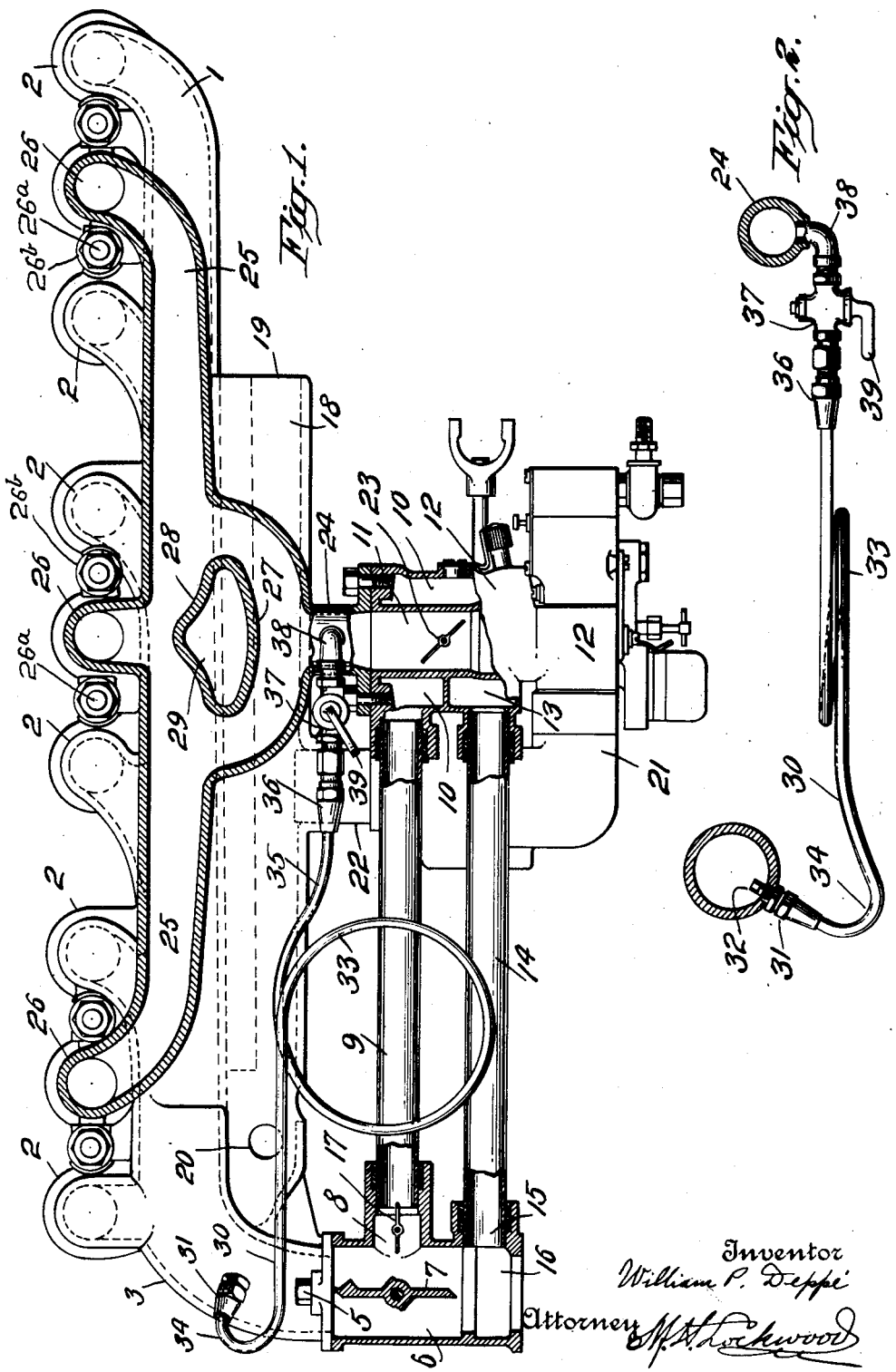

1,685,564

UNITED STATES PATENT OFFICE.

WILLIAM P. DEPPÉ, OF BRIGHTWATERS, NEW YORK.

INTERNAL-COMBUSTION ENGINE.

Application filed December 9, 1922. Serial No. 605,765.

My invention relates more particularly to the method and means of controlling the temperature, pressure and volume of products of combustion, injected into a mixture of combustibles and air, in an engine operating on a superheated dry gaseous mixture, the combustibles being vaporized and the mixture made dry by the application of heat prior to the injection of the products of combustion.

In my Patent, No. 1,335,665 of March 30, 1920, the method of operating an internal combustion engine on a superheated dry gaseous mixture is fully described and in my pending application, Ser. No. 433,179 filed Dec. 27, 1920, I have fully described the method of operating an internal combustion engine with such a mixture, diluted with a predetermined amount of the products of combustion, injected into a mixture of combustibles and air, when the combustibles are completely vaporized and the mixture rendered dry at a temperature above the boiling points of the fuel constituents, under the conditions existing in the generating means or intake manifold.

It is well known that the prior art discloses apparatus for injecting exhaust gases into the carburetor and into the mixture, while it is wet, for the purpose of assisting in vaporizing the fuel particles, and to that extent adding a diluent to the mixture. The art also shows various devices not only for the injection of hot exhaust gases, but for the injection of cold exhaust gases into the carburetor mixture, and, in some cases, such injection is adapted to be controlled by the position of the throttle valve, a mechanical connection between the throttle valve and a valve controlling the flow of exhaust gases being provided. So far as I am aware, however, no prior attempt has been made to automatically control the temperature, pressure and volume of the products of combustion, injected into a highly heated and completely vaporized mixture, the control being entirely independent of any movable mechanical means or such means connected with the throttle and yet so arranged as to function according to the speed of the engine and the throttle opening.

In operating an internal combustion engine on a lean mixture, that is, a mixture chemically perfect or leaner, which is delivered to the combustion chambers of the engine in a superheated dry gaseous state, higher compression pressures are available, but, in operating on higher compression, the amount of exhaust gases remaining in the cylinder after the exhaust stroke is much less than where the compression pressures are lower, because of the reduced volume of the clearance space. It is, therefore, desirable to supplement the residual exhaust gas by the injection of exhaust gas or products of combustion into the incoming fresh mixture.

It is true that when hot exhaust gases are injected into a highly heated mixture of combustibles and air, in which the combustibles are completely vaporized, a portion of the heat is utilized in superheating the mixture, but a further purpose of such injections is to obtain the ionizing effect of the fresh products of combustion upon the mixture. According to my method, the mixture thus ionized is further superheated and delivered as a superheated dry gaseous mixture into the combustion chambers of the engine, where it again is subjected to ionization from the residual products of combustion.

It is found that ionization and the presence in the mixture of a considerable quantity of hot products of combustion have the property of controlling the speed of inflammation and pressures arising thereby, and of giving sustained pressures after firing. Therefore, a further purpose of the injection of hot products of combustion into the superheated dry gaseous mixture is to control the combustion processes and prevent undesirable maximum temperatures and pressures in the fuel mixtures fired under high compression, after ignition takes place.

It is also well known that with hybrid fuels, such as are sold and used at the present time, in which the boiling or end points vary from say 250° F. to 435° F., or higher, mixtures thereof with air alone, when introduced into the combustion chambers, are apt to cause knocking or develop so-called detonations, particularly in so-called wet mixture operation and also under high compression pressures, even with dry mixture operation. It is found, however, that by the injection of hot products of combustion into a superheated dry gaseous mixture, knocking and so-called detonations, even in relatively high compressions, can be eliminated, and, therefore, a further purpose of injecting the hot exhaust gases is to overcome the above objections and permit the operation of the engine at very much higher compression pressures, as well as with a leaner mixture, thereby increasing the thermal efficiency.

It will also be obvious that when the exhaust gases are under a considerable pressure and there is more or less of a partial vacuum pressure in the intake, the injection of hot exhaust gases will assist in supercharging the combustion chambers, on the suction or intake stroke of the engine.

In my superheated dry gas method of operating internal combustion engines, which is now being used very largely on commercial and pleasure cars in the hands of the public, it is well known that the mixture is introduced into the cylinders of the engine at a relatively high temperature, but, as pointed out in my patent hereinbefore referred to, the range of temperatures of the superheated mixture is between the boiling or vaporizing points of the fuel constituents in air, under the partial pressure conditions of operation in the manifold, as the minimum, and below the dissociation or cracking point and point of autoignition, as a maximum, under the higher compression pressures which may be used.

The highest boiling points of the fuel constituents in air mixtures in the partial vacuum obtaining in the intake manifold, according to Dalton's laws, for instance, may be in the neighborhood of 125° F., with the hybrid fuels now on the market. The cracking point or spheroidal state of liquid hydrocarbons in air mixtures may begin in the neighborhood of 385° F. at atmospheric pressure, under any given operating conditions, but when the same hydrocarbons are in the form of vapor (gas) in air, in the intake manifold, the cracking points may not begin for several hundred degrees higher. The ignition temperature of a rich mixture of hydrocarbons in air may begin in the neighborhood of 625° F. while with lean mixtures, the ignition temperature may be as high as 1100° F.

The temperature of the products of combustion in the modern high speed internal combustion engine may vary from say 500° F., at so-called idling speeds, when the throttle is almost closed, to 1500° F. at wide open throttle and at maximum speeds, the temperatures being taken at the exhaust ports of the engine. These temperatures, of course, will vary rapidly during normal operation of an engine, where the throttle opening and speed are constantly changing.

Therefore, in providing for the injection of hot exhaust gases or products of combustion into the highly heated mixture, in the intake manifold, it will be found difficult, in view of the rapid changes in temperature, volume and pressure, of the exhaust gases and also on account of the variations in the degree of vacuum in the intake manifold, to control the temperature, pressure and volume of the exhaust gases injected into the intake manifold, and also maintain the proper temperature ranges in the complete intake charges as mentioned hereinbefore. Attempts to control the injections by manually operated means have not been successful because the average operator is not competent to judge of the conditions existing and constantly shifting, and no two operators will be likely to obtain the same results, in similar engines. If too much exhaust gases are injected into the mixture prior to its entry into the combustion chambers, the mixture will be so diluted that it might fail to ignite at some speeds and throttle opening, while, on the other hand, if the quantity of exhaust gases injected is not sufficient, the engine may knock as a result of so-called detonations, at the high compression pressure prevailing in the particular engine. These conditions of defective operation are not commercially bettered by the ordinary attempts that have been made to control the injections of products of combustion, either manually or by mechanical connection with the throttle valve, where proportions are not properly fixed, but left to the individual operator.

With my improved method and apparatus, however, these difficulties are overcome, and, by utilizing skin friction within the conduits and by coils, abrupt bends or retarding effects, together with the variations in pressure in the exhaust pipe and in the intake manifold, I have found it possible to control the temperature, pressure and volume of the products of combustion injected into the intake manifold so as to automatically supply the required amount for any variations in speed or throttle opening that may be made during normal operation of the engine, and yet maintain the complete charge, in the intake passages within the desired temperature ranges, i. e., above the boiling points of fuel constituents in air, under Dalton's laws on partial pressures, and below the dissociating or cracking points or autoignition points within any given operating limits with any given fuel. In my improvement I not only take advantage of the skin friction in the conduits, and the change in direction of flow of the products of combustion, but the cross sectional area of the conduit may be varied at one or more points so as to alternately restrict the flow and permit expansion of the gases and thereby vary the relative rate of flow under changing engine conditions, within the proper limits.

Obviously, various forms and shapes of conduits and expansion chambers may be designed for association with different forms and sizes of engines, but, as an example, I have shown, in the accompanying drawings, an adaptation particularly designed for the six-cylinder Buick engine. In the drawings, Fig. 1 shows a side elevation partially in section of the manifold and carburetor lay-out of a six-cylinder engine with my improvement and Fig. 2 shows a plan view of the gas injection tube and its connection with the exhaust and intake pipe, the latter being shown in section.

Referring to the drawings, it will be seen that I have shown my apparatus in connection with a six-cylinder engine lay-out, the cylinders of the engine, however, not being shown. The exhaust manifold 1 is connected with the cylinders of the engine by the exhaust port branches 2 and the exhaust manifold, as shown at the left in Fig. 1 of the drawings, has a bend downward at 3. The lower end of the bend 3 of the exhaust manifold is provided with flanges 4 and is connected by means of the bolts 5, with a valve chamber 6, forming a continuation of the exhaust pipe conduit. The valve chamber 6 is preferably provided with a butterfly valve 7 and the upper portion of the chamber 6 is provided with an opening at 8, connected by means of a tube 9 with a heating jacket or conduit 10, surrounding the mixing and throttle valve chamber 11 of the carburetor 12, as shown in Fig. 1 of the drawings. The jacket or conduit 10 extends annularly or spirally about the chamber 11 and the outlet end 13 is connected by means of a pipe 14 with an opening 15 in the exhaust pipe at 16 below the chamber 6 and valve 7. The outlet opening from the chamber 6 at 8 is preferably provided with a butterfly valve 17, and it will readily be seen that by closing or partially closing the butterfly valve 7, while the butterfly valve 17 is open, a forced circulation of exhaust gases through the pipe 9, jacket or conduit 10 and return pipe 14 will take place, thereby providing means for heating the mixture within the chamber 11.

A stove comprising a partial jacket 18, preferably formed integral with the lower wall of the exhaust manifold, is provided for heating the air entering the carburetor 12. The air may enter the stove or jacket at the open end 19 and through holes 20, as shown in Fig. 1 of the drawings and pass into the air inlet conduit 21 of the carburetor, through a connecting pipe 22. By this means, it will be seen that primary and secondary air supplied to the carburetor may be preheated, and suitable adjustment provided to cover extremes of hot and cold weather, thereby facilitating the vaporization of the combustibles which ordinarily comprise liquid hydrocarbons, varying in boiling points, the highest end point of the ordinary hybrid mixture, known as gasoline being about 435° in the product now sold on the market, but which may be carried much higher in my methods.

Passing heated air through the carburetor, facilitates the rapid vaporization of the liquid fuel sprayed into the air in the carburetor and, in the present device, the mixture thus formed in the carburetor is further subjected to heat in the jacketed chamber 11 and with the assistance of the eddies and cross currents formed in the chamber by the presence of the throttle valve 23, the fuel particles will be rapidly broken up and vaporized and the mixture rendered dry and substantially homogeneous.

The mixture then passes from the chamber 11 into the lower end 24 of the intake manifold 25, which, as shown in Fig. 1 of the drawings, is provided with the usual branches 26 leading to the three pairs of blocks of the six cylinder engine. It will be seen that direct passage upward of the mixture in the riser 24 is prevented by the wall 27 of the manifold conduit and this wall 27 with the walls 28 form an interior recess or cavity 29. The cavity 29 lies directly adjacent the wall of the exhaust pipe 1, over which the manifold 25 lies and, it will be seen that the walls 27 and 28 may become heated to a considerably higher temperature than the lower or outer walls of the intake manifold, thereby providing a heating stage for heating the mixture. It will be also observed that the intake port connecting branches 26 of the intake manifold overlie the exhaust manifold with slight air gap only between the metals of the two manifolds and, therefore, are subjected to radiated heat from the exhaust gas conduits, thereby providing another controlled heating stage for heating the mixture in the intake manifold. It will be noted also that in this specific construction, the terminals of intake and exhaust conduits are held in place by bolts 26ª from engine casting and ring lugs 26ᵇ, which have the effect of conducting heat from the exhaust pipe to the intake pipe, tempered, however, by the bolts in engine block, and air radiation. This forms a further stage of heat application to the fuel mixture, just before entering the valve chambers.

In operating an internal combustion engine according to my superheated method, as described in my patent hereinbefore referred to, it has been found desirable, for the best results, to heat the incoming mixture in stages, as it were, and thus progressively raise its temperature above the boiling points of the fuel constituents in the air mixture in the intake manifold and superheat the mixture so that it is delivered into the combustion chambers of the engine as a superheated dry gaseous mixture. It has been pointed out that in the present apparatus, heat is applied to the incoming air before it enters the carburetor, then the mixture is heated in the mixing chamber 11 by the jacket surrounding the throttle valve, then in the manifold proper at the junction between the riser and spreader arms and then again at the branch pipes 26 connecting the intake manifold with the intake ports of the engine.

Thus means is provided for progressive heating in successive stages and for preparing and delivering to the engine a superheated dry gaseous mixture.

As previously pointed out, however, I have found it desirable to inject into the superheated dry gaseous mixture a predetermined controlled amount of hot products of combustion, the temperature, pressure and volume of which may be automatically controlled without movable mechanical means or connections. This may be done by properly proportioning and designing the conduit connection between the exhaust manifold and the intake manifold. For this purpose, I preferably provide a long conduit or tube 30, one end of which is connected at 31, with a cut-in pipe 32, which enters the side of the elbow or turn 3, of the exhaust manifold, in such a position (as indicated in Fig. 2 of the drawings) as to avoid the centrifugal action of the exhaust gases taking the turn in the elbow, thus preventing any solid or liquid particle of lubricating oil or dust from entering the cut-in tube. The conduit or pipe 30 is preferably of larger diameter than the opening in the cut-in tube 32, so as to permit expansion of the exhaust gases when it enters the conduit 30. The conduit 30 may be of sufficient length to provide for a considerable amount of skin friction within the conduit and this is utilized to advantage in delaying the flow of the exhaust gases through the conduit. Preferably the conduit 30 is provided with one or more coils 33, and the conduit may be bent as at 34 and 35 to deflect the flow of the exhaust gases passing through the conduit and thus further add to the slowing up of the exhaust gases. This retarding of the flow of the exhaust gases through the conduit 30 and the expansion permitted therein facilitates the rapid radiation of excessive heat from the exhaust gases, and the proportions of the conduit can be so selected that the exhaust gases passing out of the conduit, will pass out in proper volume for all throttle openings and engine speeds, and within the proper temperature limits in the exhaust gases, and also maintain the temperature in the complete intake changes within the proper limits already described herein.

The other end of the conduit 30 is connected at 36 with a valve member 37, which, in turn, is connected with an elbow pipe 38, which enters the riser 24 of the intake manifold, as shown in Figs. 1 and 2 of the drawings. The diameter or cross-sectional area of the elbow tube 38 may be equal to or greater than that of the conduit 30 while the valve member 37 is adapted to form a restricted opening, since the bore therein may be considerably smaller than that of the conduit 30 or the elbow pipe 38. The restricted opening or passage is preferably made adjustable in size by means of a valve or cock 39, operating in the usual manner in the valve member 37.

By means of the apparatus described, it will be seen that the exhaust gases, entering the cut-in pipe 32, will be subjected to expansion when entering the larger pipe of the conduit 30 and will be slightly concentrated by passing through the restricted opening in the valve member 37 and further restricted by the valve 39, if the latter is partially closed. After passing the restricted opening in the valve member 37—39, the exhaust gases will again be permitted to expand in the elbow tube 38 and then pass into the mixture in the riser 24 of the intake manifold, setting up great turbulence in the mixture at this point. The mixture of combustibles and air, when it reaches the point in the riser 24 where the exhaust gases are injected into it, will have reached a temperature above the boiling points of the fuel constituents, in air under the partial pressure in the manifold, at which time the combustibles are completely vaporized. It will be remembered that the air entering the carbureter has been preheated and the mixture formed therewith is subjected to additional heat in the jacketed chamber 11.

The exhaust gases, after passing through the conduit 30, are introduced into the riser 24 of the intake manifold at automatically reduced temperatures, which normally will be considerably above the temperature of the mixture coming from the chamber 11. The exhaust gases so introduced, however, are not of sufficiently high temperature to crack the fuel particles, but they may be hot enough to assist in superheating the mixture, and, with hot gases, it is well known that diffusion is very rapid. The hot products of combustion, introduced into a dry gaseous mixture, will also have the property of ionizing the mixture, and it has been found that this is desirable, particularly in mixtures subjected to high compression pressures in the cylinders of the engine, for it has the effect of controlling the inflammation and pressures arising thereby and giving sustained pressures after ignition.

In practice, it has been found that the valve or cock 39 may be adjusted to give the greatest flow of exhaust gases and yet permit perfect firing when the engine is idling or when the throttle is almost completely closed, and it is found that thereafter the valve may be left in this fixed position of adjustment for all other speeds, throttle openings and conditions. The relative difference of pressure of the gases in the exhaust manifold and intake manifold will then automatically control the amount of exhaust gases entering the intake manifold. Thus, it will be seen that I have provided a simple, efficient and commercially practical method and apparatus at low cost for automatically controlling the temperature, pressure and volume of exhaust gases injected into the superheated dry gaseous mixture before it is delivered to the engine, and yet control the temperature of the complete charge within the intake passage, within certain limits already referred to herein. Obviously, the apparatus described has peculiar advantages in that no moving parts are involved; no connections with the throttle valve and no manual control. On the contrary, after the valve or cock 39 is properly adjusted, it may be considered as fixed and should not be disturbed.

While I have shown one form of my improvement, in connection with a well known type of engine now on the market, it will be understood that I am not limited to the specific details of construction for, in carrying out the method described, it will be understood that various forms of apparatus may be devised to accomplish the results desired. For instance, the proportions of the various conduits and pipes may be varied and expansion chambers, retarding and other means for deflecting and controlling the flow of the mixture may be substituted for bends and coils or turns, and various angles and shapes may be incorporated as well as additional restricted passages and various other modifications may be made without departing from the spirit and scope of the invention.

I claim:—

1. In an internal combustion engine, the combination with a carburetor and exhaust and intake manifolds, of means for heating the mixture leaving the carburetor and in the intake manifold, for supplyig the engine with a superheated dry gaseous mixture, means for injecting into the mixture in the intake manifold, after the mixture has been heated and become dry, a predetermined amount of hot products of combustion, comprising a tube cut into the exhaust pipe at a point beyond the exhaust port openings, said cut-in tube having a passage of small diameter, a conduit of small diameter conneeded therewith, said conduit being of larger diameter than the passage in said cut-in tube whereby the exhaust gases are adapted to expand, means comprising coils and bends in said conduit for retarding the flow of the exhaust gas therethrough, a connecting tube entering the intake manifold for injecting the exhaust gases from said conduit into said manifold, and a connecting member between said coiled conduit and said connecting tube, provided with a restricted opening through which the flow of exhaust gases may be controlled according to the speed and throttle opening of the engine.

2. In an internal combustion engine, the combination with a carburetor and intake and exhaust manifolds, of means for utilizing the exhaust gases for preparing a superheated dry gaseous mixture for operating the engine, means for injecting a predetermined amount of hot exhaust gases into the heated mixture in the intake manifold, above the carburetor, comprising a tube of predetermined relatively small diameter extending from the exhaust pipe to the riser of the intake manifold, the diameter and length of said tube being preselected to provide a predetermined amount of skin friction within the tube for controlling the rate of flow therethrough according to the amount of exhaust required, said tube being provided with coils and bends which cooperate with the skin friction in the tube to control and retard the flow of exhaust gases therethrough, a restricted passage from the exhaust manifold into said tube and a restricted passage in said tube just before it enters the intake manifold, the size of the last named restricted passage being adapted to be varied to predetermined and fix for the particular engine the relative amount of exhaust gases passing through said tube and into the intake manifold, thereby to control the temperature of such exhaust gases so that they may enter the mixture in the intake manifold at a temperature above the partial pressure boiling points, but below the temperature of cracking of the liquid fuels.

3. The combination as claimed in claim 2, in which an adjustable valve is provided for varying the size of said last named restricted passage, said valve being adapted to be manually adjusted for each engine to permit the entrance into the intake manifold of an amount of exhaust gases to be determined by the amount required at a certain predetermined engine speed and throttle opening, which valve adjustment thereafter becomes permanent and remains fixed for all other speeds and throttle openings.

WILLIAM P. DEPPÉ.